US008898176B2

(12) United States Patent
Coker et al.

(10) Patent No.: US 8,898,176 B2
(45) Date of Patent: Nov. 25, 2014

(54) RETRIEVING RATABLE CONTENT BASED ON A GEOGRAPHIC LOCATION (75) Inventors: Doug Coker, San Francisco, CA (US); Colby D. Ranger, San Francisco, CA (US); Leon G. Palm, Santa Monica, CA (US); John D. Westbrook, Reston, VA (US); Daniel Berlin, North Potomac, MD (US); Helen V. Hunt, Washington, DC (US); Ethan C. Ambabo, Evanston, IL (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/092,361

(22) Filed: Apr. 22, 2011

(65) Prior Publication Data

US 2012/0271836 A1 Oct. 25, 2012

(51) Int. Cl.
*G06F 17/30* (2006.01)
(52) U.S. Cl.
CPC .................................. *G06F 17/3087* (2013.01)
USPC ......................................................... 707/749
(58) Field of Classification Search
None
See application file for complete search history.

(56) References Cited

U.S. PATENT DOCUMENTS

| | | | |
|---|---|---|---|
| 2003/0028455 A1* | 2/2003 | Yamaguchi et al. | 705/35 |
| 2005/0130676 A1* | 6/2005 | Broussard et al. | 455/456.6 |
| 2007/0161382 A1* | 7/2007 | Melinger et al. | 455/456.1 |
| 2008/0307053 A1 | 12/2008 | Mitnick et al. | |
| 2009/0210444 A1* | 8/2009 | Bailey et al. | 707/103 R |
| 2010/0076968 A1* | 3/2010 | Boyns et al. | 707/732 |
| 2011/0087427 A1* | 4/2011 | Liu | 701/200 |
| 2011/0112866 A1* | 5/2011 | Gerrans | 705/3 |
| 2011/0208617 A1* | 8/2011 | Weiland | 705/27.1 |
| 2012/0191844 A1* | 7/2012 | Boyns et al. | 709/224 |
| 2012/0198042 A1* | 8/2012 | Dunbar et al. | 709/223 |

OTHER PUBLICATIONS http://en.wikipedia.org/wiki/Google_Moderator, *Wikipedia*, "Google Moderator" Jan. 20, 2011.
Novelty Search Report NL Appl. No. 2008665, mailed Jul. 28, 2014, pp. 1 to 19.

* cited by examiner

*Primary Examiner* — Bai D. Vu
(74) *Attorney, Agent, or Firm* — Bracewell & Giuliani LLP (57) ABSTRACT

A computer-implemented method includes receiving (i) a request for ratable content, and (ii) information specifying a geographic location of a computing device; accessing a data repository configured to store items of ratable content, with an item of ratable content associated with a geographic location; obtaining a plurality of items of ratable content related to the geographic location of the computing device; sending, from the obtained items of ratable content, an item of ratable content to the computing device; receiving a request for ratable content associated with a level of granularity relative that is higher than the level of granularity of the sent item of ratable content; sending, to the computing device, another item of ratable content, from the obtained items of ratable content, that is associated with a level of granularity that is higher than the level of granularity of the previously sent item of ratable content.

19 Claims, 5 Drawing Sheets

# RETRIEVING RATABLE CONTENT BASED ON A GEOGRAPHIC LOCATION

TECHNICAL FIELD

This document relates generally to retrieving ratable content based on a geographic location.

BACKGROUND

The Internet provides access to a number of online forums in which people can exchange information, ideas, opinions, and digital resources of various formats. Examples of these online forums include blogs, digital bulletin boards, online discussion boards, social websites, online gaming sites, online market places, and so forth. A user of an online forum can submit content ("content submissions") to a server of the online forum, and the server provides the content submissions to other users for viewing and/or comments. Generally, content submissions include user submitted information, including, e.g., questions, ideas, comments, media resources, and so forth.

The server may generate items of ratable content, for example, by converting a content submission to a format that promotes receipt of rating information for the content submission. Generally, an item of ratable content includes a content submission that may be rated by users. Rating information may be in the form of comments, an approval vote, a disapproval vote, and so forth.

In an example, a server of an online forum receives a large number of content submissions from the users and generates a large number of items of ratable content from the content submissions. In order to facilitate viewing of the items of ratable content by the users, the server may generate "series," for example, by associating the items of ratable content with topic categories. Generally, a topic category includes a label that is used to identify at least a portion of the items of ratable content. Generally, a series includes a grouping of items of ratable content that are associated with a particular topic category.

For items of ratable content in a series, the server may rank the items of ratable content, for example, based on rating information received for the items of ratable content. In an example, the items of ratable content are each associated with a number of votes. For an item of ratable content, the server tallies the votes received for the item of ratable content. The item of ratable content is ranked, based on an overall number of votes received, relative to the overall number of votes received for the other items of ratable content.

SUMMARY

In one aspect of the present disclosure, a computer-implemented method includes receiving (i) a request for ratable content, and (ii) information specifying a geographic location of a computing device associated with the request for ratable content; accessing a data repository configured to store items of ratable content, with an item of ratable content associated with a geographic location; obtaining, from the data repository, a plurality of items of ratable content related to the geographic location of the computing device, with the items of ratable content being arranged to specify an order in which the items of ratable content are depicted on the computing device, with the order at least partly based on levels of granularity associated with the items of ratable content and with the items of ratable content associated with lower levels of granularity being ordered for depiction on the computing device before items of ratable content associated with higher levels of granularity; sending, from the obtained items of ratable content, an item of ratable content to the computing device, with the sent item of ratable content being associated with a level of granularity that is lower than at least a level of granularity associated with one or more of the other obtained items of ratable content; receiving a request for ratable content associated with a level of granularity relative that is higher than the level of granularity of the sent item of ratable content; sending, to the computing device, another item of ratable content, from the obtained items of ratable content, that is associated with a level of granularity that is higher than the level of granularity of the previously sent item of ratable content; and receiving, from the computing device, information indicative of a ranking for the item of ratable content associated with the higher level of granularity.

Implementations of the disclosure may include one or more of the following features. In some implementations, an item of ratable content includes information indicative of a feature of the geographic location. In the other implementations, the feature of the geographic location includes information indicative of one or more of (i) features of a physical building, (ii) features pertaining to an ephemeral aspect of the geographic location, and (iii) features pertaining to a cultural aspect of the geographic location.

In still other implementations, the method includes receiving, for an item of ratable content sent to the computing device, rating information from a user of the computing device; generating a pointer between the rating information and the item of ratable content sent to the computing device; and causing the rating information and the pointer to be stored in the data repository. The method may also include receiving a selection of an item of ratable content sent to the computing device; obtaining information related to the selected item of ratable content; and sending, to the computing device, the information related to the selected item of ratable content.

In some implementations, the method includes detecting a change in the geographic location of the computing device; updating, based on detecting, the geographic location of the computing device; retrieving one or more updated items of ratable content, a geographic location of an updated item of ratable content corresponding to the updated geographic location of the computing device; and sending the one or more updated items of ratable content to the computing device.

In other implementations, the method includes ranking the one or more obtained items of ratable content at least partly based on one or more of (i) a popularity score of at least one of the one or more retrieved items of ratable content, (ii) a geographic relevance score of at least one of the one or more retrieved items of ratable content, (iii) a content quantity score of at least one of the one or more retrieved items of ratable content, and (iv) a spam score of at least one of the one or more retrieved items of ratable content.

In yet other implementations, the method includes accessing a threshold distance; generating, based on the threshold distance, a circumference of an area surrounding the geographic location of the computing device; sending, to the data repository, a query for one or more items of ratable content that are each associated with a geographic location that is included in the circumference of the area.

In another aspect of the disclosure, one or more machine-readable media are configured to store instructions that are executable by one or more processing devices to perform operations including receiving (i) a request for ratable content, and (ii) information specifying a geographic location of a computing device associated with the request for ratable content; accessing a data repository configured to store items of ratable content, with an item of ratable content associated with a geographic location; obtaining, from the data repository, a plurality of items of ratable content related to the geographic location of the computing device, with the items of ratable content being arranged to specify an order in which the items of ratable content are depicted on the computing device, with the order at least partly based on levels of granularity associated with the items of ratable content and with the items of ratable content associated with lower levels of granularity being ordered for depiction on the computing device before items of ratable content associated with higher levels of granularity; sending, from the obtained items of ratable content, an item of ratable content to the computing device, with the sent item of ratable content being associated with a level of granularity that is lower than at least a level of granularity associated with one or more of the other obtained items of ratable content; receiving a request for ratable content associated with a level of granularity relative that is higher than the level of granularity of the sent item of ratable content; sending, to the computing device, another item of ratable content, from the obtained items of ratable content, that is associated with a level of granularity that is higher than the level of granularity of the previously sent item of ratable content; and receiving, from the computing device, information indicative of a ranking for the item of ratable content associated with the higher level of granularity. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: receiving (i) a request for ratable content, and (ii) information specifying a geographic location of a computing device associated with the request for ratable content; accessing a data repository configured to store items of ratable content, with an item of ratable content associated with a geographic location; obtaining, from the data repository, a plurality of items of ratable content related to the geographic location of the computing device, with the items of ratable content being arranged to specify an order in which the items of ratable content are depicted on the computing device, with the order at least partly based on levels of granularity associated with the items of ratable content and with the items of ratable content associated with lower levels of granularity being ordered for depiction on the computing device before items of ratable content associated with higher levels of granularity; sending, from the obtained items of ratable content, an item of ratable content to the computing device, with the sent item of ratable content being associated with a level of granularity that is lower than at least a level of granularity associated with one or more of the other obtained items of ratable content; receiving a request for ratable content associated with a level of granularity relative that is higher than the level of granularity of the sent item of ratable content; sending, to the computing device, another item of ratable content, from the obtained items of ratable content, that is associated with a level of granularity that is higher than the level of granularity of the previously sent item of ratable content; and receiving, from the computing device, information indicative of a ranking for the item of ratable content associated with the higher level of granularity. Implementations of this aspect of the present disclosure can include one or more of the foregoing features.

In yet another aspect of the disclosure an electronic system includes means for receiving (i) a request for ratable content, and (ii) information specifying a geographic location of a computing device associated with the request for ratable content; means for accessing a data repository configured to store items of ratable content, with an item of ratable content associated with a geographic location; means for obtaining, from the data repository, a plurality of items of ratable content related to the geographic location of the computing device, with the items of ratable content being arranged to specify an order in which the items of ratable content are depicted on the computing device, with the order at least partly based on levels of granularity associated with the items of ratable content and with the items of ratable content associated with lower levels of granularity being ordered for depiction on the computing device before items of ratable content associated with higher levels of granularity; means for sending, from the obtained items of ratable content, an item of ratable content to the computing device, with the sent item of ratable content being associated with a level of granularity that is lower than at least a level of granularity associated with one or more of the other obtained items of ratable content; means for receiving a request for ratable content associated with a level of granularity relative that is higher than the level of granularity of the sent item of ratable content; means for sending, to the computing device, another item of ratable content, from the obtained items of ratable content, that is associated with a level of granularity that is higher than the level of granularity of the previously sent item of ratable content; and means for receiving, from the computing device, information indicative of a ranking for the item of ratable content associated with the higher level of granularity. Implementations of this aspect of the present disclosure can include one or more of the foregoing features.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein is a system that retrieves items of ratable content based on a geographic location of a client device. Generally, a geographic location includes information that uniquely identifies a physical location, including, e.g., by latitude and longitude coordinates. Using the techniques described herein, the ratable content may include numerous different types of content, including, e.g., content indicative of physical features of the geographic location, such as the physical location of buildings. The content may also include information indicative of other types of features of the geographic location, including, e.g., (i) design features of a physical building (e.g., architectural design, square footage, and the like), (ii) features pertaining to an ephemeral aspect of the geographic location (e.g., art work and cars that are located in the geographic location), and (iii) features pertaining to a cultural aspect of the geographic location (e.g., matters of personal taste, such as menus for restaurants and individual items included on the menus).

In an example, an application running on the client device generates a request for items of ratable content. To promote the system's ability to retrieve ratable content that is relevant to a geographic location of the client device, the application running on the client device also accesses information specifying a geographic location associated with the client device and includes the geographic information in the request. Based on the request, the system is configured to identify items of ratable content that are associated with the geographic location of the client device.

Figure 1:
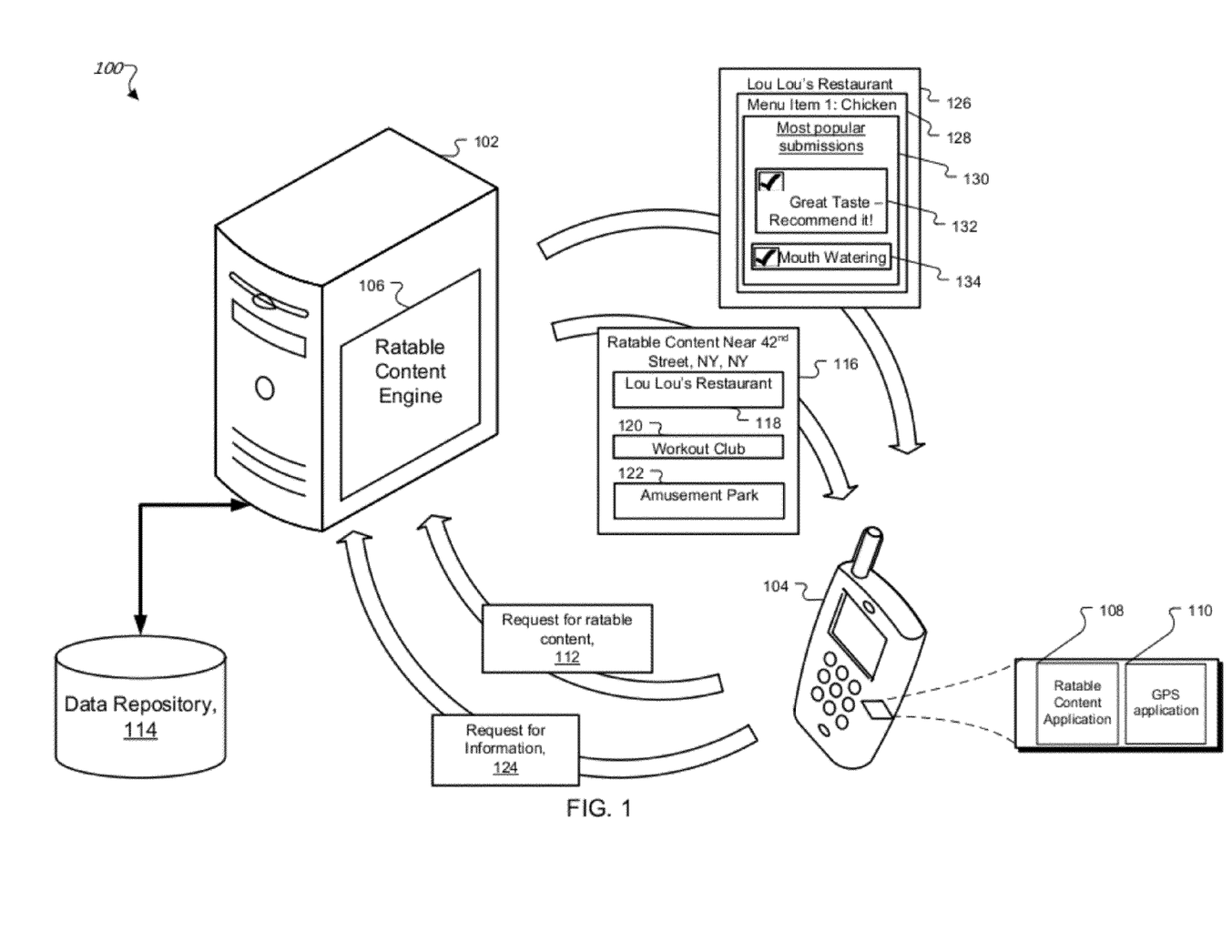
FIG. 1 is a conceptual diagram of a system that retrieves items of ratable content.

FIG. 1 is a conceptual diagram of a system 100 that retrieves items of ratable content. System 100 includes server 102, client device 104, and data repository 114. Server 102 includes ratable content engine 106. Ratable content engine 106 is configured to retrieve ratable content that is associated with a geographic location of client device 104. Client device 104 includes ratable content application 108 and Global Positioning System ("GPS") application 110. Ratable content application 108 is configured to generate request 112 for ratable content. GPS application 110 is configured receive information specifying the geographic location of client device 104, for example, from a space-based global navigation satellite system ("GNSS"). In a variation of FIG. 1, client device 104 may be configured to receive information specifying the geographic location of client device 104 from another system, external to system 100, that is configured to detect geographic locations, including, e.g., an Assisted Global Position System ("AGPS"), a Micro-GPS system, a Global System for Mobile Communications Cell Identifier system, and so forth.

Data repository 114 is configured to store items of ratable content, including, e.g., items 118, 120, 122 of ratable content. In an example, an item of ratable content stored in data repository 114 is tagged with information specifying a geographic location associated with the item of ratable content, as described in further detail below. Generally, tagging includes assigning a label to an item of data to identify the data and/or to identify a characteristic of the data.

In the example of FIG. 1, GPS application 110 sends the geographic location of client device 104 to ratable content application 108. Ratable content application 108 includes the geographical location of client device 104 in request 112 for ratable content. Server 102 receives request 112 for ratable content. Ratable content engine 106 parses request 112 for ratable content to determine the geographic location of client device 104. Based on the geographic location of client device 104, ratable content engine 106 retrieves items 118, 120, 122 of ratable content from data repository 114. In the example of FIG. 1, items 118, 120, 122 of ratable content are included in a series of ratable content, namely, series 116 of ratable content.

In an example, items 118, 120, 122 of ratable contents are associated with a geographic location that corresponds to the geographic location of client device 104. Generally, a correspondence includes a similarity and/or a match between a characteristic (e.g., a geographic location) of one item of data and a characteristic of another item of data.

In an example, an item of data is associated with a geographic location of Main Street, NY, N.Y. In this example, another item of data is also associated with a geographic location of Main Street, NY, N.Y. Because both of the items of data have the same geographic location, namely Main Street, NY, N.Y., the geographic locations of the items of data correspond to each other.

In another example, an item of data is associated with a geographic location of Lowell Street, NY, N.Y. In this example, another item of data is associated with a geographic location of Yellow Street, NY, N.Y. Using GPS, the system described herein determines that Lowell Street merges into Yellow Street in NY, N.Y. Accordingly, the geographic locations of the items of data correspond to each other, because Lowell Street, NY, N.Y. is similar to Yellow Street, NY, N.Y. in that these streets merge.

In the example of FIG. 1, the geographic location of client device 104 is 145 42$^{nd}$ Street, NY, N.Y. In this example, ratable content engine 106 retrieves, from data repository 114, series of ratable content 116 associated with a geographic location that corresponds to 145 42$^{nd}$ Street, NY, N.Y. Series of ratable content 116 includes item 118 of ratable content, which includes information for "Lou Lou's Restaurant." Series of ratable content 116 also includes item 120 of ratable content, which includes information for a "Workout Club." Series of ratable content 116 also includes item 122 of ratable content, which includes information for an "Amusement Park."

In the example of FIG. 1, server 102 sends series of ratable content 116 to client device 104. Client device 104 displays series of ratable content 116, for example, for a user (not shown) of client device 104 to view. The user of client device 104 selects one of the items 118, 120, 122 of ratable content that is of interest to the user. The user of client device 104 may select one of the items 118, 120, 122 of ratable content, for example, by selecting a link (not shown) associated with one of the items 118, 120, 122 of ratable content. In the example of FIG. 1, the user selects item 118 of ratable content. Ratable content application 108 detects the selection of item 118 of ratable content. Based on the detected selection, ratable content application 108 is configured to generate request 124 for information related to item 118 of ratable content. Ratable content engine 106 receives request 124. In response, ratable content engine 106 retrieves, from data repository 114, ratable content information 126, which includes information related to Lou Lou's Restaurant and which is related to item 118 of ratable content. Generally, ratable content information 126 includes information that is related to an item of ratable content.

Ratable content information 126 includes information specifying various menu items that are served by Lou Lou's Restaurant. In an example, ratable content information 126 includes menu item 128. Menu item 128 includes rating information 130. Generally, rating information 130 includes information specifying a level of quality for an item that is evaluated.

In the example of FIG. 1, rating information 130 includes item 132 of rating information and item 134 of rating information. Items 132, 134 of rating information both include rating information, for menu item 128, that has been submitted to server 102 by users of system 100. In this example, items 132, 134 of rating information are ranked according to "most popular submissions," for example, by tallying a number of votes received for each of items 132, 134 of rating information and the rankings are displayed in order. In a "most popular submissions ranking," the item of rating information that receives a largest number of votes, relative to the other items of rating information, is ranked first among the items of rating information.

In the example of FIG. 1, server 102 sends ratable content information 126 to client device 104. Client device 104 displays ratable content information 126 for the user of client device 104. Based on ratable content information 126, the user of client device 104 may choose to purchase a menu item that has been recommended by other users of system 100.

In an example, the user of client device 104 may submit to server 102 rating information (not shown) for menu item 128, for example, after the user has tasted menu item 128. Following receipt of the rating information for menu item 128, ratable content engine 106 may be configured to determine additional items of ratable content that are associated with the geographic location of client device 104. Ratable content engine 106 may be configured to send to client device 104 the additional items of ratable content, for example, to inform the user of client device 104 of other destinations that may be within a pre-defined proximity of client device 104.

In this example, after the user of client device 104 has submitted rating information for menu item 128, ratable content engine 106 sends to client device 104 additional items of ratable content information, including, e.g., items 120, 122 of ratable content. In another example, after the user of client device 104 has submitted rating information for menu item 128, ratable content engine 106 sends to client device 104 additional items of ratable content information, including, e.g., items of ratable content that have not previously been sent to client device 104.

Figure 2:
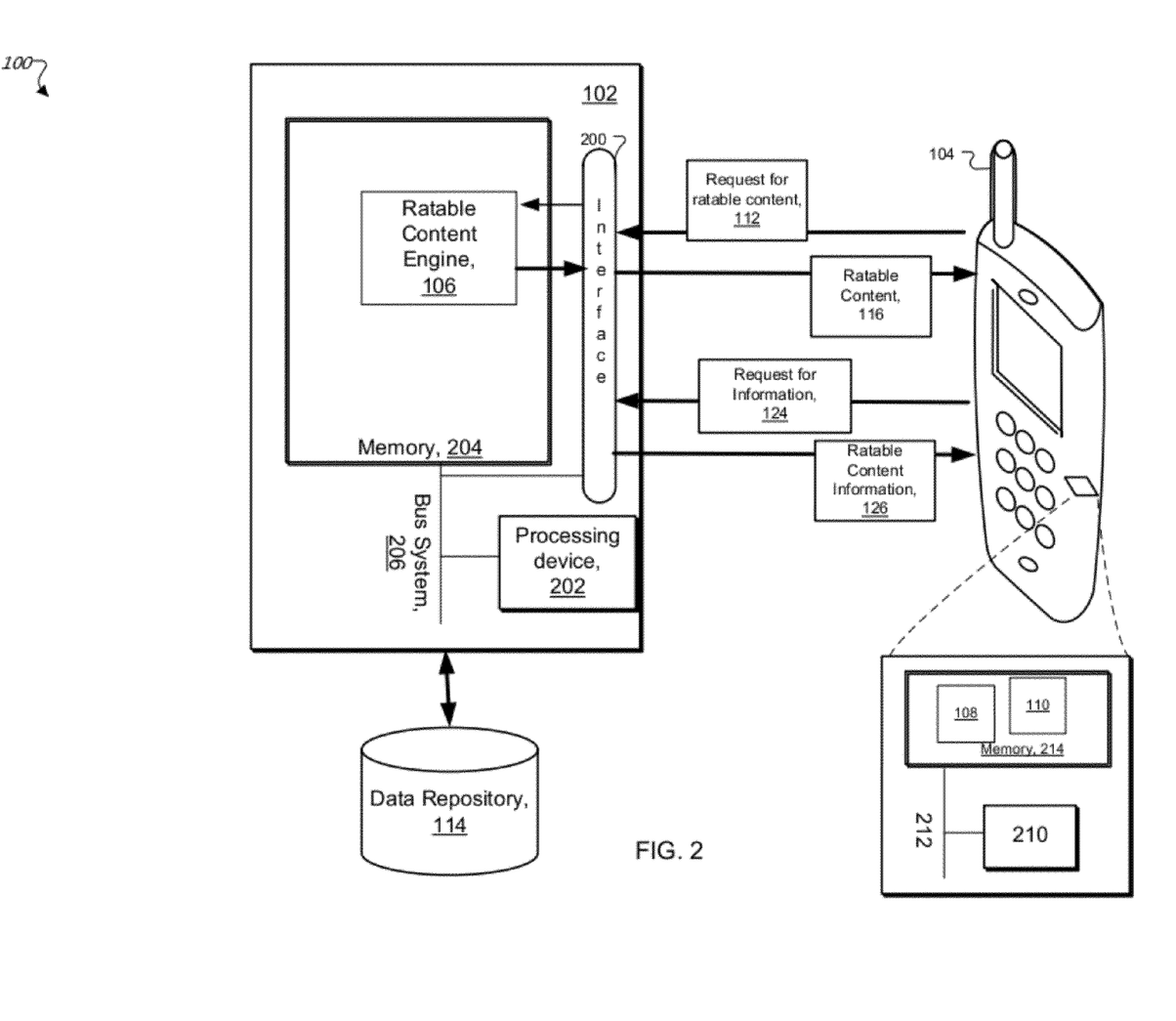
FIG. 2 is a block diagram of components of the system that retrieves items of ratable content.

FIG. 2 is a block diagram of components of system 100 that retrieves items 118, 120, 122 of ratable content. In FIG. 2, reference numbers 118, 120, 122, 128, 130, 132, and 134 are not shown.

Client device 104 can be any sort of computing device capable of taking input from a user and communicating over a network (not shown) with server 102 and/or with other client devices. For example, client device 104 can be a mobile device, a desktop computer, a laptop, a cell phone, a personal digital assistant ("PDA"), a server, an embedded computing system, a mobile device and so forth.

Client device 104 also includes a processing device 210 and memory 214. A bus system 212, including, for example, a data bus and a motherboard, can be used to establish and to control data communication between the components of client device 104.

Processing device 210 may include one or more microprocessors. Generally, processing device 210 may include any appropriate processor and/or logic that is capable of receiving and storing data, and of communicating over a network (not shown). Memory 214 can include a hard drive and a random access memory storage device, such as a dynamic random access memory, or other types of non-transitory machine-readable storage devices. As shown in FIG. 2, memory 214 stores computer programs that are executable by processing device 210. These computer programs include ratable content application 108 and GPS application 110.

Server 102 can be any of a variety of computing devices capable of receiving information, such as a server, a distributed computing system, a desktop computer, a laptop, a cell phone, a rack-mounted server, and so forth. Server 102 may be a single server or a group of servers that are at a same location or at different locations.

Server 102 can receive information from client device 104 via input/output ("I/O") interface 200. I/O interface 200 can be any type of interface capable of receiving information over a network, such as an Ethernet interface, a wireless networking interface, a fiber-optic networking interface, a modem, and so forth. Server 102 also includes a processing device 202 and memory 204. A bus system 206, including, for example, a data bus and a motherboard, can be used to establish and to control data communication between the components of server 102.

Processing device 202 may include one or more microprocessors. Generally, processing device 202 may include any appropriate processor and/or logic that is capable of receiving and storing data, and of communicating over a network (not shown). Memory 204 can include a hard drive and a random access memory storage device, such as a dynamic random access memory, or other types of non-transitory machine-readable storage devices. As shown in FIG. 2, memory 204 stores computer programs that are executable by processing device 202. These computer programs include ratable content engine 106.

In an example, ratable content engine 106 may be configured to receive content submissions (not shown), for example, from client device 104. From the content submissions, ratable content engine 106 generates an item of ratable content, for example, by generating a rating control for the content submission and by associating the rating control with the content submission. In an example, the rating control includes an interactive user interface element that is configured to accept rating information from a user and to forward the rating information to server 102. Server 102 associates the rating information with the ratable content item, which includes the content submission for which the rating information was accepted.

Ratable content engine 106 is also configured to tag items 118, 120, 122 of ratable content with geographic locations associated with items 118, 120, 122 of ratable content. In an example, item 118 of ratable content includes a content submission (not shown) for a restaurant, e.g., Lou Lou's Restaurant. In this example, item 118 of ratable content includes one or more attributes for the content submission. Generally, an attribute includes information specifying a property of a content submission, including, e.g., the name of Lou Lou's Restaurant, an address associated with Lou Lou's Restaurant, and so forth.

In this example, ratable content engine 106 uses the attributes of item 118 of ratable content to determine a geographic location associated with item 118 of ratable content. Ratable content engine 106 is configured to implement a geocoding process that determines the geographic location for item 118 of ratable content, for example, based on the attributes of item 118 of ratable content. Generally, geocoding includes a process of finding a geographic location (e.g., latitude and longitude coordinates) from other geographic information, including, e.g., street addresses, zip codes, and so forth. (See Goldberg, Daniel W., "A Geocoding Best Practices Guide.," University of Southern California, GIS Research Laboratory, 2008). Following the determination of the geographic location associated with item 118 of ratable content, ratable content engine 106 tags item 118 of ratable content with the geographic location for Lou Lou's Restaurant.

In another example, ratable content engine 106 may be configured to access a geocoding system that is external to system 100. In this example, ratable content engine 106 receives, from the external geocoding system, information specifying the geographic location associated with item 118 of ratable content.

In an example, attributes of a content submission need not include geographic information. Rather, in this example, the content submission includes information specifying a name of a restaurant (e.g., Lou Lou's Restaurant). In this example, ratable content engine 106 is configured to access an address look-up system, including, e.g., a service that determines a physical address for a location based on a name of the location. In this example, ratable content engine 106 retrieves, from the address look-up system, a physical address for Lou Lou's Restaurant. Ratable content engine 106 implements the geocoding process on the physical address for Lou Lou's Restaurant to determine a geographic location for Lou Lou's Restaurant. Ratable content engine 106 tags item 118 of ratable content with the geographic location for Lou Lou's Restaurant.

Ratable content engine 106 is also configured to retrieve, from data repository 114, items 118, 120, 122 of ratable content associated with geographic locations that correspond to the geographic location of client device 104. In an example, ratable content engine 106 may be configured to use a threshold distance (e.g., one-half a mile, one mile, five miles and so forth) to determine a correspondence between the geographic location of client device 104 and a geographic location associated with an item of ratable content.

Generally, a threshold distance includes information specifying a pre-defined distance that may exist between (i) a geographic location associated with an item of ratable content and (ii) the geographic location of client device 104, for example, for the geographic location associated with the item of ratable content to be identified as corresponding to the geographic location of client device 104. In an example, when a distance between a geographic location associated with an item of ratable content and the geographic location of client device 104 is less than or equal to the threshold distance, ratable content engine 106 is configured to identify the geographic location associated with the item of ratable content as corresponding to the geographic location of client device 104. In another example, when the distance between the geographic location associated with the item of ratable content and the geographic location of client device 104 is greater than the threshold distance, ratable content engine 106 is configured to identify the geographic location associated with the item of ratable content as not corresponding to the geographic location of client device 104.

In an example, the geographic location of client device 104 may include latitude and longitude coordinates (e.g., 90° N, 35° W). The items of ratable content in data repository 114 are also associated with geographic locations that include latitude and longitude coordinates. Ratable content engine 106 may be configured to retrieve, from data repository 114, items of ratable content associated with geographic locations that are within the threshold distance of the geographic location of client device 104, as described in further detail below with regard to FIG. 3.

In an example, ratable content application 108 is configured to detect a change in the geographic location of client device 104. In this example, ratable content application 108 is configured to periodically request, from GPS application 110, an updated geographic location associated with client device 104. When ratable content application 108 detects a change in the geographic location of client device 104, ratable content application 108 generates an updated request for ratable content and sends the updated request for ratable content to ratable content engine 106. The updated request for ratable content includes the updated geographic location associated with client device 104. Based on the updated request for ratable content, ratable content engine 106 sends to client device 104 updated items of ratable content. In this example, the updated items of ratable content are associated with a geographic location that corresponds to the updated geographic location of client device 104.

Ratable content engine 106 may also be configured to rank items 118, 120, 122 of ratable content, for example, based on any combination of (i) a popularity score of at least one of items 118, 120, 122 of ratable content, (ii) a geographic relevance score of at least one of items 118, 120, 122 of ratable content, (iii) a content quantity score of at least one of items 118, 120, 122 of ratable content, and (iv) a spam score of at least one of items 118, 120, 122 of ratable content, each of which is described in detail below.

Ratable content engine 106 may rank items 118, 120, 122 of ratable content based on popularity scores associated with items 118, 120, 122 of ratable content. Generally, a popularity score includes information specifying a number of users who have submitted rating information for an item of ratable content. In an example, twenty users have submitted rating information for item 118 of ratable content. Ten users have submitted rating information for item 120 of ratable content. In this example, item 118 of ratable content is associated with a popularity score that is higher than the popularity score of item 120 of ratable content, because more users have submitted rating information for item 118 of ratable content than for item 120 of ratable content.

Ratable content engine 106 may also be configured to rank items 118, 120, 122 of ratable content based on geographic relevance scores. Generally, a geographic relevance score includes information specifying a) a proximity of one geographic location (e.g., associated with an item of ratable content) to the geographic location of client device 104, relative to b) the proximity of another geographic location (e.g., associated with another item of ratable content) to the geographic location of the client device 104. In an example, ratable content engine 106 determines the distance between a geographic location associated with an item of ratable content and the geographic location of client device 104, for example, using the Pythagorean formula as described in further detail below with regard to FIG. 3. An example of the determined distances is provided in the below Table 1.

TABLE 1

| Items of Ratable Content | Distance | Geographic Relevance Score |
|---|---|---|
| Item 118 of ratable content | .5 miles | 3 |
| Item 120 of ratable content | .25 miles | 2 |
| Item 122 of ratable content | .1 miles | 1 |

As illustrated in the above Table 1, item 118 of ratable content is associated with a geographic location that is 0.5 miles away from the geographic location of client device 104. Item 120 of ratable content is associated with a geographic location that is 0.25 miles away from the geographic location of client device 104. Item 122 of ratable content is associated with a geographic location that is 0.1 miles away from the geographic location of client device 104.

In this example, item 122 of ratable content is associated with a geographic location that is closest to the geographic location of client device 104, relative to the geographic locations associated with items 118, 120 of ratable content. In this example, ratable content engine 106 assigns item 122 of ratable content a geographic relevance score with a value of one to indicate that the geographic location associated with item 122 of ratable content is closer to the geographic location of client device 104 than the geographic locations of items 118, 120 of ratable content.

Ratable content engine 106 assigns item 120 of ratable content a geographic relevance score with a value of two to indicate that the geographic location associated with item 120 of ratable content is a) geographically further away from client device 104 than the geographic location associated with item 122 of ratable content, and b) geographically closer to client device 104 than the geographic location associated with item 118 of ratable content. Ratable content engine 106 assigns item 118 of ratable content a geographic relevance score with a value of three to indicate that the geographic location associated with item 118 of ratable content is geographically further away from the geographic location of client device 104 than the geographic locations associated with items 120, 122 of ratable content.

Ratable content engine 106 may also be configured to rank items 118, 120, 122 of ratable content based on content quantity scores. Generally, a content quantity score includes information specifying an amount of information (e.g., ratable content information 126 in FIG. 1, ranking information 130, and so forth) associated with an item of ratable content relative to other items of ratable content. As previously described, an amount of information for an item of ratable content may be determined by tallying a number of votes received for the item of ratable content.

In an example, an item of ratable content associated with a smaller amount of information, relative to other items of ratable content, is associated with a lower content quantity score. In another example, an item of ratable content associated with a larger amount of information, relative to other items of ratable content, is associated with a higher content quantity score.

Ratable content engine 106 may also be configured to rank items 118, 120, 122 of ratable content based on spam scores. Generally, a spam score includes information specifying an amount of disruptive content and/or "junk" content included in an item of ratable content. To determine an amount of spam associated with an item of ratable content, ratable content engine 106 may include a spam detector.

In an example, an item of ratable content associated with a smaller amount of spam, relative to other items of ratable content, is associated with a lower spam score. In another example, an item of ratable content associated with a larger amount of spam, relative to other items of ratable content, is associated with a higher spam score.

In still another example, ratable content engine 106 is also configured to rank items 118, 120, 122 based on a level of granularity associated with items 118, 120, 122. Generally, a level of granularity includes information indicative of an amount of specificity associated with an item of data. In an example, ratable content engine 106 is configured to rank items of ratable content associated with lower levels of granularity above items of ratable content associated with higher levels of granularity such that items of ratable content associated with lower levels of granularity are displayed (e.g., depicted on a computing device) for a user prior to the display of items of ratable content associated with higher levels of granularity. In an example, a user can "drill down" into items of ratable content, e.g., by viewing less specific content first (e.g., a menu for a restaurant) and subsequently viewing more specific content (e.g., a particular item on the menu).

For a particular item of ratable content, ratable content engine 106 may also be configured to rank individual items included in ratable content information 126, including, e.g., items 130, 132 of rating information, using any the ranking techniques described herein.

Figure 3:
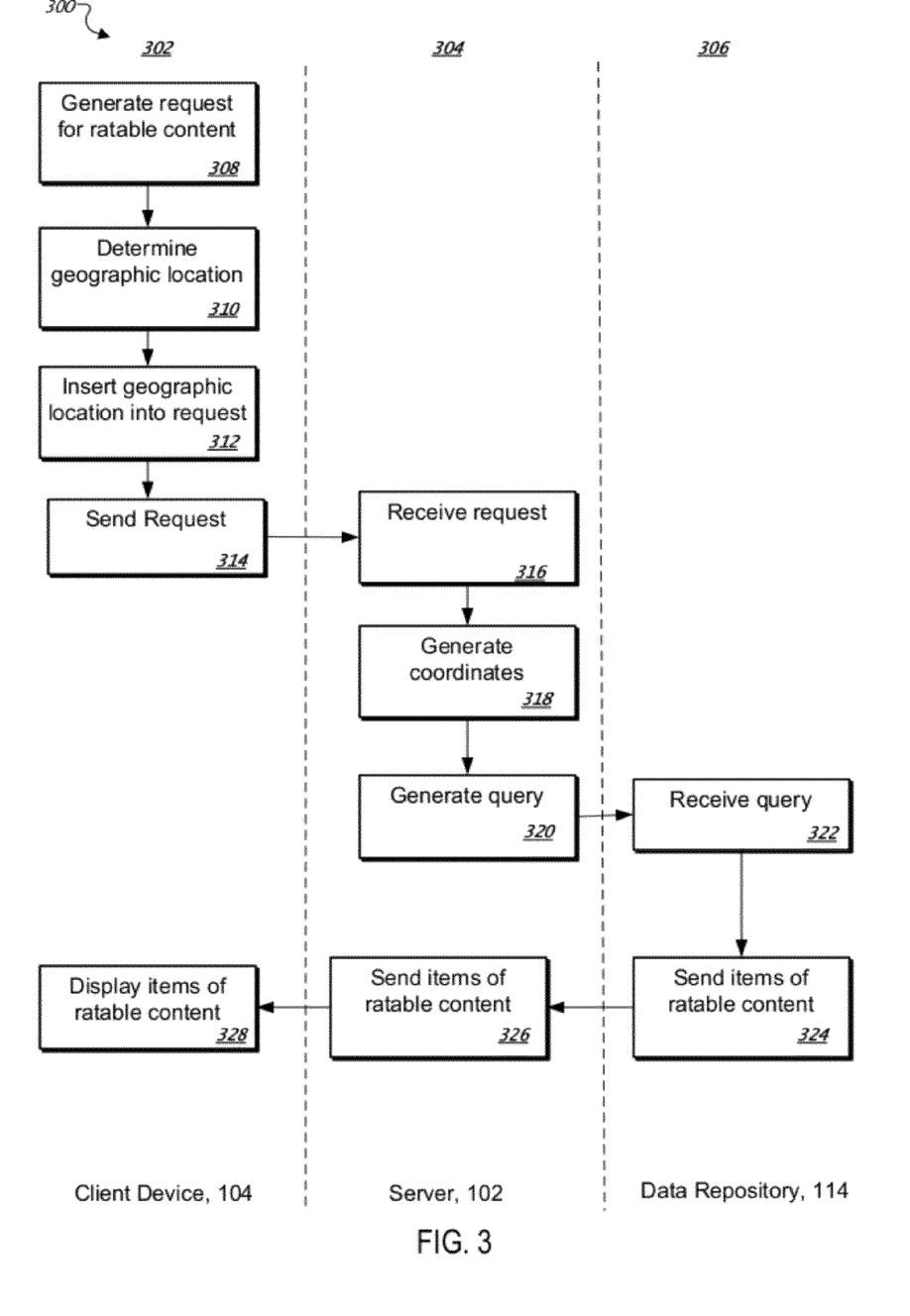
FIG. 3 is a flow chart of a process for retrieving items of ratable content.

FIG. 3 is a flow chart of a process 300 for retrieving items of ratable content. In FIG. 3, process 300 is split into a left part 302, which is performed on client device 104, a center part 304, which is performed on server 102, and a right part 306, which is performed on data repository 114. In an example, left part 302, or a portion thereof, is performed by ratable content application 108 and/or by GPS application 110. In another example, center part 304, or a portion thereof, is performed by ratable content engine 106.

In operation, ratable content application 108 generates (308) request 112 for ratable content. GPS application 110 determines (310) the geographic location of client device 104. Ratable content application 108 receives (not shown) the geographic location of client device 104 from GPS application 110. Ratable content application 108 inserts (312) the geographic location into request 112 for ratable content. Ratable content application 108 sends (314) request 112 for ratable content to server 102. Server 102 receives (316) request 112 for ratable content.

Ratable content engine 106 retrieves items 118, 120, 122 of ratable content, from data repository 114, by performing the following actions. From data repository 114, ratable content engine 106 accesses (not shown) the threshold distance that is used to determine a correspondence between the geographic location of client device 104 and a geographic location associated with an item of ratable content.

Ratable content engine 106 uses the threshold distance to determine an area, such as a circumference of a circular area surrounding the geographic location of client device 104. Each point within the circular area and on the circumference of the circular area is located a distance from the geographic location of client device 104 that is equal to or less than the threshold distance. Ratable content engine 106 generates (318) latitude and longitude coordinates indicative of the circumference of the circular area. Ratable content engine 106 generates (320) a query for items of ratable content associated with geographic locations that are encompassed by the circular area. Ratable content engine 106 includes (not shown) the latitude and longitude coordinates indicative of the circumference of the circular area in the query.

Data repository 114 receives (322) the query and sends (324) to sever 102 items 118, 120, 122 of ratable content associated with geographic locations that are encompassed by the circular area. In an example, items 118, 120, 122 of ratable content are tagged with latitude and longitude coordinates of a geographic location associated with the item of ratable content. In this example, data repository 114 is configured to return to server 102 items 118, 120, 122 of ratable content associated with latitude and longitude coordinates that are encompassed by the latitude and longitude coordinates of the circular area.

Ratable content engine 106 receives (not shown) items 118, 120, 122 of ratable content. Ratable content engine 106 sends (326) items 118, 120, 122 of ratable content to client device 104. Client device 104 displays (328) items 118, 120, 122 of ratable content, for example, for the user of client device 104.

In a variation of FIG. 3, ratable content engine 106 confirms that the distance between a geographic location associated with an item of ratable content and the geographic location of client device 104 is less than or equal to the threshold distance. In an example, ratable content engine 106 retrieves from data repository 114 the geographic location of the item of ratable content. The geographic location of the item of ratable content includes latitude and longitude coordinates.

In this example, ratable content engine 106 calculates the distance between the geographic location associated with the item of ratable content and the geographic location of client device 104, for example, using a) the Pythagorean formula, b) the latitude and longitude coordinates associated with the geographic location of client device 104, and c) the retrieved latitude and longitude coordinates associated with the item of ratable content. When the distance between the geographic location associated with the item of ratable content and the geographic location of client device 104 is confirmed as less than (or equal to) the threshold distance, ratable content engine 106 is configured to send the item of ratable content to client device 104.

In another variation of FIG. 3, series of ratable content (e.g., series of ratable content 116) are associated with geographic locations, rather than the individual items of ratable content. In this example, ratable content engine 106 performs actions 316, 318 and 320 to retrieve series of ratable content 116.

Figure 4:
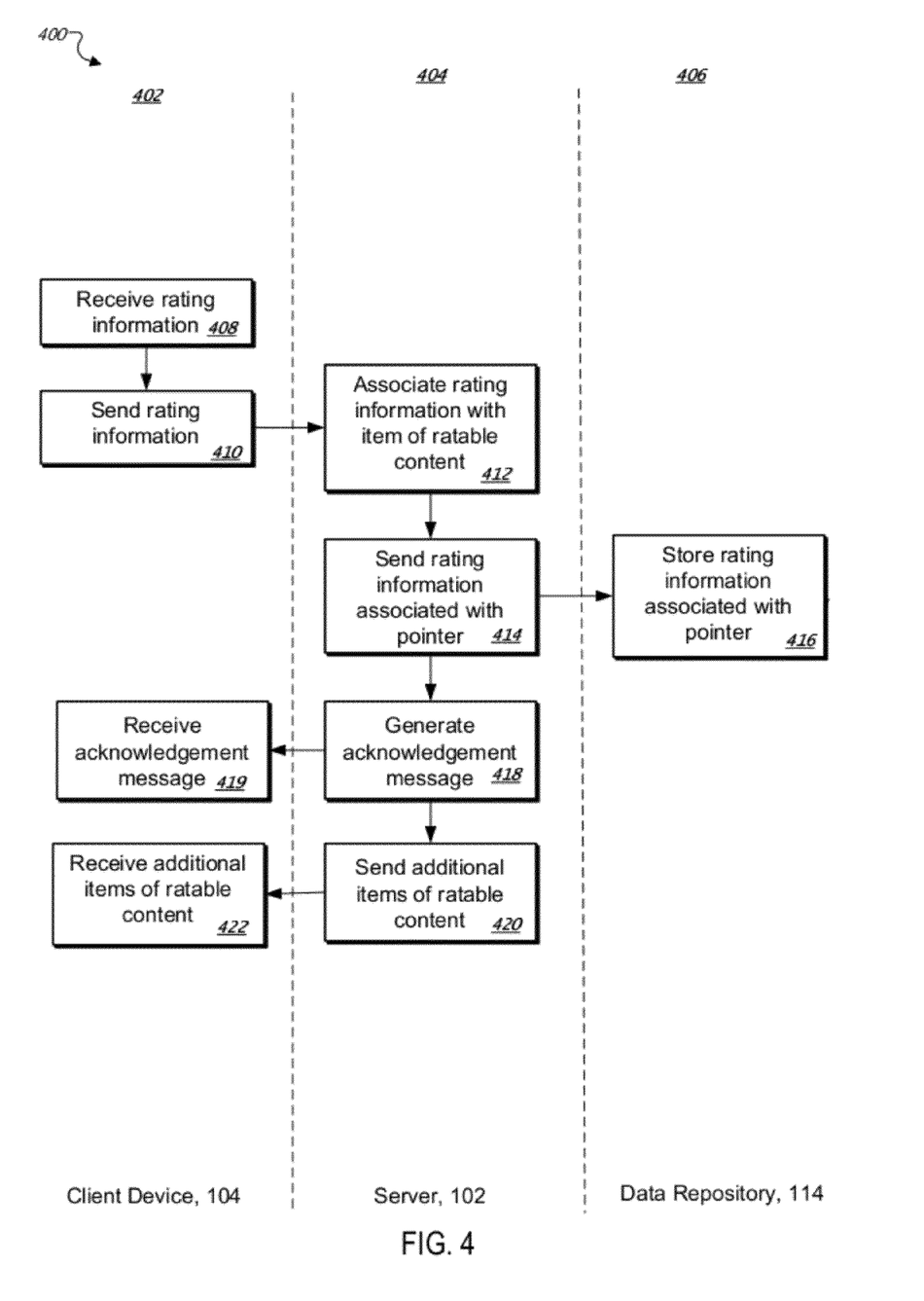
FIG. 4 is a flow chart of a process for updating an item of ratable content with ranking information provided by a user of a client device.

FIG. 4 is a flow chart of a process 400 for updating item 118 of ratable content with ranking information provided by the user of client device 104. In FIG. 4, process 400 is split into a left part 402, which is performed on client device 104, a center part 404, which is performed on server 102, and a right part 406, which is performed on data repository 114. In an example, left part 402, or a portion thereof, is performed by ratable content application 108. In another example, center part 304, or a portion thereof, is performed by ratable content engine 106.

In operation, ratable content application 108 receives (408) rating information from the user of client device 104. Referring back to FIG. 1, the user of client device 104 selects item 118 of ratable content and views ratable content information 126 for item 118 of ratable content. In the example of FIG. 1, the user of client device 104 views menu item 128 and rating information 130 for menu item 128. In an example, the user of client device 104 submits rating information (not shown) for menu item 128. The submitted rating information is received by ratable content application 108.

Ratable content application 108 sends (410) the submitted rating information to server 102. Ratable content engine 106 receives (not shown) the submitted rating information and associates (412) the submitted rating information with item 118 of ratable content, for example, by generating a pointer between the submitted rating information and item 118 of ratable content. Generally, a pointer includes a data structure that causes one item of information to reference another item of information.

Ratable content engine 106 sends (414) the rating information, received from the user of client device 104 and associated with the pointer, to data repository 114. Data repository 114 stores (416) the rating information received from the user of client device 104. Data repository 114 also stores the pointer associating item 118 of ratable content with the rating information received from the user of client device 104.

Ratable content engine 106 generates (418) an acknowledgement message (not shown) to acknowledge receipt of the rating information received from the user of client device 104. Ratable content engine 106 sends (not shown) the acknowledgement message to client device 104. Client device 104 receives (119) the acknowledgement message.

Ratable content engine 106 also sends (420) to client device 104 additional items of ratable content that are associated with a geographic location corresponding to the geographic location of client device 104. In an example, the additional items of ratable content include items of ratable content that have not been selected and/or viewed by the user of client device 104. In the example of FIG. 1, ratable content engine 106 may re-send to client device 104 items 120, 122 of ratable content, which include items of ratable content that were not selected by the user of client device 104. Client device 104 receives (422) the additional items of ratable content.

Using the techniques described herein, ratable content engine 106 is configured to retrieve items 118, 120, 122 of ratable content based on a geographic location of client device 104. Ratable content engine 106 may also be configured to detect a change in the geographic location of client device 104 and to provide updated items of ratable content, based on the detected change in geographic location. Ratable content engine 106 may also be configured to receive rating information from a user of client device 104 and to update a relevant item of ratable content with the received rating information.

Figure 5:
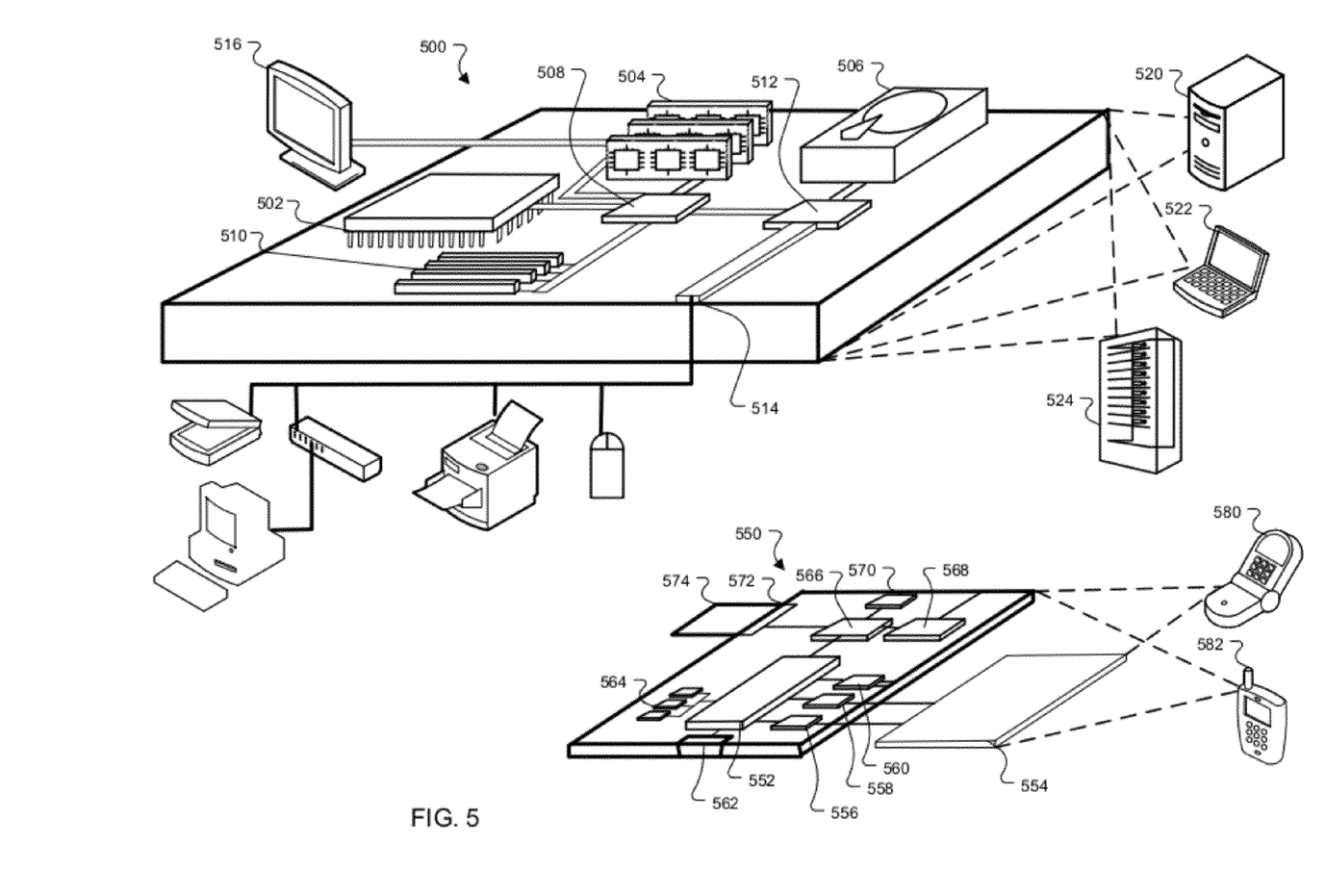
FIG. 5 shows an example of a computer device and a mobile computer device that can be used to implement the techniques described herein.

FIG. 5 shows an example of a computer device 500 and a mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 704, 706, 708, 710, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the processes and techniques described herein. In an example, there are numerous other ways that the system may minimize power usage, including, e.g., performing name processing locally on a client device, performing name processing in dedicated hardware (rather than on a general purpose central processing unit), reducing a frequency at which incoming sound is processed for name recognition, processing incoming sound for name recognition when sound level is above a frequency threshold, varying the frequency threshold based on factors (e.g., time of day, input from other sensors, calendar entries, battery level, and so forth) that may predict the likelihood that the system will be addressed so as to trade off effectively between a system recall rate and power usage, and so forth.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Although a few implementations have been described in detail above, other modifications are possible. Moreover, other mechanisms for editing voice may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations not specifically described herein are also within the scope of the following claims.

What is claimed is:

1. A method for receiving information about an item of ratable content relating to a restaurant, the method comprising:
   receiving from a client device a request for ratable user-submitted content about restaurants, the ratable user-submitted content about restaurants including submissions to an online forum that have been converted to a format that promotes the receipt of rating information for each submission;
   receiving from the client device a geographic location specifying where the request for ratable user-submitted content about restaurants pertains;
   identifying, via a processor, a plurality of items of ratable user-submitted content about restaurants within an area that includes the geographic location based on geographic distances between restaurants and the geographic location, the items of ratable user-submitted content about restaurants being stored in a data repository that associates items of ratable content with rating information specifying a level of quality of the respective items of ratable content based on user ratings of the respective items of ratable content;
   ranking the plurality of items of ratable user-submitted content about restaurants according to the level of specificity such that less specific items of ratable user-submitted content about restaurants are ranked above more specific items of ratable user-submitted content about restaurants;
   sending information to the client device describing the plurality of items of ratable user-submitted content about restaurants;
   receiving from the client device a selection of an item of ratable user-submitted content about a restaurant; and
   sending information to the client device describing ratable user-submitted content about a menu item of the restaurant of the received.

2. The method of claim 1, comprising receiving, from the client device, a rating of the ratable user-submitted content about a menu item of the restaurant of the received.

3. The method of claim 1, comprising:
   identifying, after receiving the rating, additional items of ratable content associated with the geographic location; and
   sending the additional items of ratable content.

4. The method of claim 3, wherein identifying additional items of ratable content comprises determining that other restaurants are within a pre-defined proximity to the location and identifying additional items of ratable user-submitted content about restaurants associated with those other restaurants.

5. The method of claim 3, wherein identifying additional items of ratable content comprises determining that the additional items of ratable user-submitted content about restaurants have not been previously sent to the client device.

6. The method of claim 1, comprising:
receiving from another client device a content submission about a restaurant; and
generating an item of ratable user-submitted content about a restaurant by generating a rating control for the content submission and associating the rating control with the content submission, wherein the rating control comprises interactive user interface elements configured to accept rating information from a user and forward the rating information to a server.

7. The method of claim 6, wherein generating the submitted item of ratable content comprises tagging the item of ratable content with a related geographic location.

8. The method of claim 6, wherein the submitted item of ratable content includes a name and a street address.

9. The method of claim 6, comprising:
determining a geographic location of the submitted item of ratable content by geocoding attributes provided by the other client device; and
associating the determined geographic location with the submitted item of ratable content.

10. The method of claim 9, wherein geocoding attributes provided by the other client device comprises:
querying an address look-up system with a user-provided name of the submitted item of ratable content.

11. The method of claim 1, wherein identifying a plurality of items of ratable user-submitted content about restaurants within an area that includes the geographic location comprises:
determining that corresponding restaurants are within a threshold geographic distance to the geographic location.

12. The method of claim 1, comprising:
determining that the client device has moved to another geographic location;
determining that an updated plurality of items of ratable user-submitted content about restaurants are within a threshold geographic distance to the other geographic location; and
sending the updated plurality of items of ratable content to the client device.

13. The method of claim 12, wherein determining that the client device has moved to another geographic location comprises:
repeatedly querying the client device for a location; and
determining that the client device has moved by comparing responsive locations.

14. The method of claim 1, comprising:
further ranking the plurality of items of ratable user-submitted content about restaurants according to a number of users who have submitted rating information for each item of ratable user-submitted content about restaurants.

15. The method of claim 1, comprising:
calculating geographic distances between the geographic location and geographic locations of each of the items of ratable user-submitted content about restaurant; and
further ranking the plurality of items of ratable user-submitted content about restaurants according to the geographic distances.

16. The method of claim 1, comprising:
assigning content quality scores to each of the items of ratable user-submitted content about restaurants, the content quality scores being calculated by counting a number of user votes for the respective item of ratable user-submitted content about restaurants; and
further ranking the plurality of items of ratable user-submitted content about restaurants according to content quality scores.

17. The method of claim 1, comprising:
further ranking the plurality of items of ratable user-submitted content about restaurants according to spam scores of the items of ratable user-submitted content about restaurants.

18. A tangible, non-transitory, machine readable medium storing instructions that when executed by a data processing apparatus cause the data processing apparatus to effectuate operations comprising:
receiving from a client device a request for ratable user-submitted content about restaurants;
receiving from the client device a geographic location specifying where the request for ratable user-submitted content about restaurants pertains;
identifying, via a processor, a plurality of items of ratable user-submitted content about restaurants within an area that includes the geographic location based on geographic distances between restaurants and the geographic location;
ranking the plurality of items of ratable user-submitted content about restaurants according to the level of specificity such that less specific items of ratable user-submitted content about restaurants are ranked above more specific items of ratable user-submitted content about restaurants;
sending information to the client device describing the plurality of items of ratable user-submitted content about restaurants;
receiving from the client device a selection of an item of ratable user-submitted content about a restaurant; and
sending information to the client device describing the ratable user-submitted content about a menu item of the restaurant of the received.

19. A system, comprising:
one or more processors;
memory in communication with the processors and storing instructions that when executed cause the processors to effectuate operations comprising:
receiving from a client device a request for ratable user-submitted content about restaurants;
receiving from the client device a geographic location specifying where the request for ratable user-submitted content about restaurants pertains;
identifying a plurality of items of ratable user-submitted content about restaurants within an area that includes the geographic location based on geographic distances between restaurants and the geographic location;
ranking the plurality of items of ratable user-submitted content about restaurants according to the level of specificity such that less specific items of ratable user-submitted content about restaurants are ranked above more specific items of ratable user-submitted content about restaurants;
sending information to the client device describing the plurality of items of ratable user-submitted content about restaurants;
receiving from the client device a selection of an item of ratable user-submitted content about a restaurant; and
sending information to the client device describing ratable user-submitted content about a menu item of the restaurant of the received.

* * * * *